Patented Jan. 15, 1935

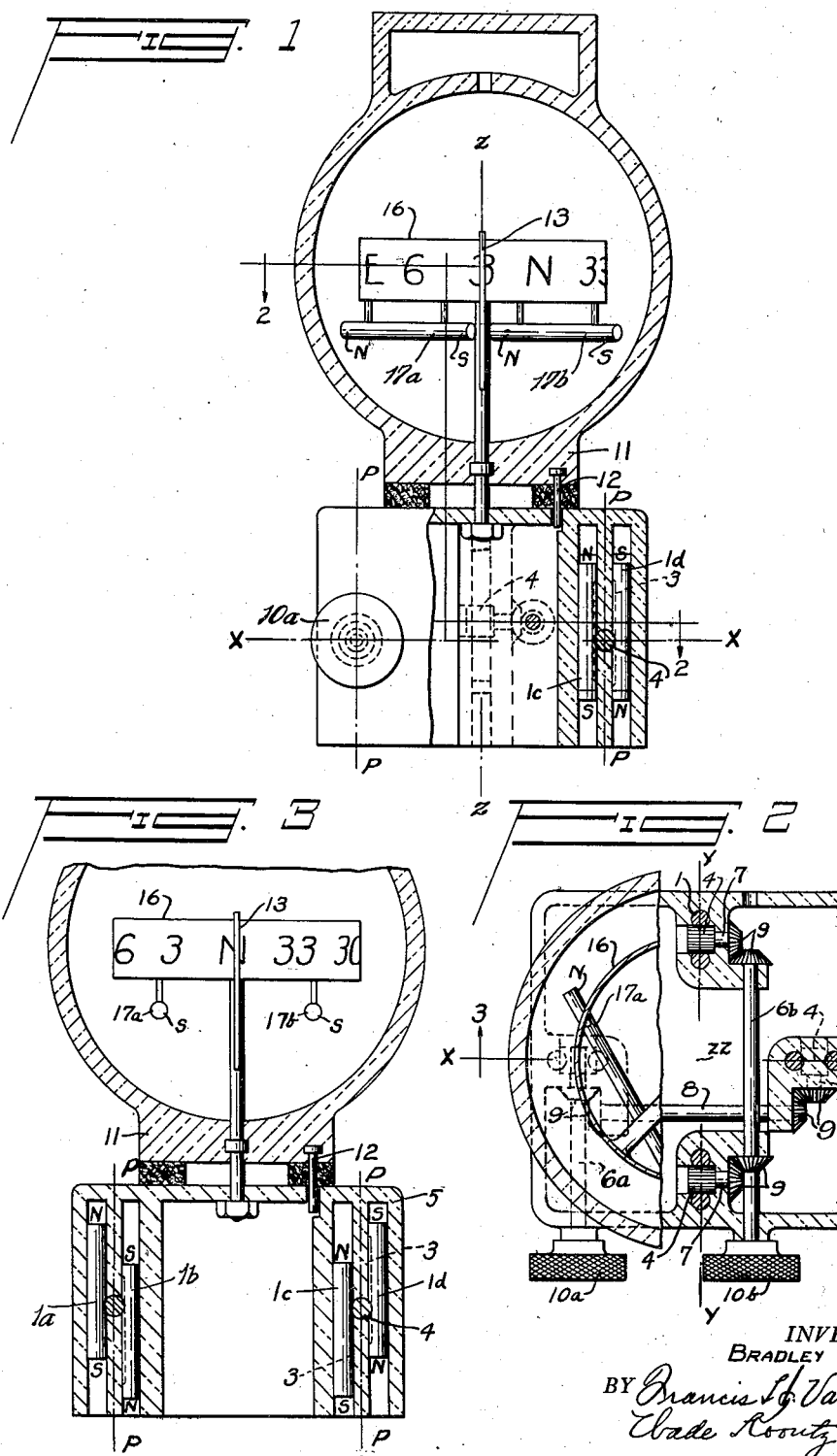

1,987,624

UNITED STATES PATENT OFFICE 1,987,624

COMPASS DEVIATION CORRECTOR

Bradley Jones, Cincinnati, Ohio

Application January 18, 1933, Serial No. 652,404

8 Claims. (Cl. 33—225)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to a device for correcting compass deviations and is particularly designed for use in connection with the correction of deviations occurring in compasses such as are used in aircraft or small water-craft.

The principal object of the invention is to provide a deviation corrector which may be used for correcting ordinary semicircular deviations with substantial accuracy by persons unfamiliar with magnetism or its effect upon the induction compass or the ordinary magnetic compass.

Another object is to provide a simplified mechanism for obtaining the results hereinabove described, which will require only the simplest of verbal or written instructions for operation, and which will further be completely housed against accidental disturbance of adjusted parts or loss of parts, prior adjustment.

It is common to the art to position aircraft or small watercraft on a series of known magnetic headings through employment of a swinging base or table. Compensation of the compass for the four cardinal headings may be readily effected through employment of the hereinafter described mechanism.

With the foregoing and other objects in view, which will appear as the description proceeds, the invention consists of improvements embodied in a semicircular deviation corrector as hereinafter more fully illustrated and described in the accompanying drawing and more particularly pointed out in the appended claims.

Referring to the drawing, in which numerals of like character designate similar parts through the several views:

Fig. 1 is a side view in partial cross-section of an ordinary aircraft compass embodying the improvements of my invention;

Fig. 2 is a cross-section of Fig. 1 taken on the line 2—2; and

Fig. 3 is a cross-section of Fig. 2 taken on the line 3—3 and shows a certain magnet adjustment.

The principal parts of my invention consists of small bar magnets $1a$ through $d$. In Figs. 1 through 3, the magnets $1a$ through $d$ are provided with racks 3. Pinions 4 engage the racks 3 and serve to secure the magnets 1 within a housing 5. One of the pinion gears 4 is fixedly attached to a driving shaft $6a$ and the remaining three pinion gears 4 are fixedly attached to driven shafts 7. Two of the driven shafts 7 are interconnected by means of a second driving shaft $6b$ and bevel gears 9 fixedly attached thereto, while the remaining driven shafts 7 are interconnected by means of an intermediate shaft 8 and bevel gears 9 fixedly attached thereto. Knobs 10 are also fixedly attached to the driving shafts 6. The housing 5 is centrally and flexibly secured to the lower extremity of a compass bowl 11. The housing 5 is maintained in predetermined plan relationship with the bowl 11 by means of a pin 12 or other suitable means. The axes of symmetry $x$—$x$ and $y$—$y$ of the two sets of magnets are thus relatively fixed with reference to the plan view of a lubber line 13.

The operation of my invention is as follows.

Two sets of magnets, composed of four magnets per set, are carried by a housing in such a manner that their principal axes of symmetry $x$—$x$ and $y$—$y$ lie at right angles to one another and that said principal axes further intersect and lie at right angles to a common vertical axis of reference $z$—$z$. The vertical axis of reference $z$—$z$ passes through the center of the compass card 16 and is coincidental with the longitudinal axis of the compass bowl 11. It will be further noted that each set of magnets is composed of two pairs of oppositely disposed magnets and that the axes of symmetry P—P of each pair of magnets are always parallel to one another and at right angles to the principal axis of symmetry of the magnet sets to which they appertain.

In Figs. 1 through 3, the four axes of symmetry P—P of the four pairs of magnets are fixedly positioned equidistant from and parallel to the aforementioned vertical axis of reference $z$—$z$. The magnets of each pair of magnets are so positioned that their adjacent ends are of dissimilar polarity. When magnets of equal magnitude are in the position shown in Fig. 1, a mininum of apparent magnetic attraction exists in magnet pairs $1a$—$1b$ and $1c$—$1d$ and they will theoretically exercise no deflecting force upon the magnetic fields in which the two card magnets 17 of the compass card 16 are immersed. If, however, the knob $10a$ is turned in a clockwise direction, the magnets $1a$ and $1d$ will be raised and the magnets $1b$ and $1c$ will be lowered into a relationship similar to that shown in Fig. 3. In such a position, the standing fields of the magnets $1a$ and $1d$ will exercise a deflecting force upon the magnetic fields in which the card magnets 17 are immersed, assuming that the compass card 16 was in the position shown in Fig. 1, prior to clockwise adjustment of the knob $10a$. If, on the other hand, the knob 10a is turned in a counter-clockwise direction, the above-mentioned deflecting force is converted into an attracting force. By placing a craft containing my invention upon a swinging base or table and by proper adjustments of the knobs 10a and 10b, it is possible to progressively compensate the compass card 16 for "west", then "east" and "north" then "south" headings in a manner which will be referred to in detail forthwith.

Simple verbal or written instructions should be issued to users of my invention, based upon the following:

Let it be assumed that the aircraft or watercraft containing my invention has been put onto a north course by means of a swing base. Let it be further assumed that the compass card 16 has been found to indicate a reading of 30°, as shown in Fig. 1. It is obvious that the compass card 16 must be rotated 30° in a clockwise direction if the north cardinal of the card is to be made to coincide with the lubber line 13, as shown in Fig. 3. If the knob 10a is gradually turned in a clockwise direction, the north pole of magnet 1a and the south pole of magnet 1d will be elevated in the manner shown in Fig. 3. The aforementioned magnet elevation will bring the north poles of magnets 1a and 17a and the south poles of magnets 1d and 17b into relatively close proximity. The aforementioned magnet arrangement will induce an appreciable repelling force, which force will gradually turn the compass card 16 in a clockwise direction. With proper adjustment of the knob 10a, the card position shown in Fig. 3 may be readily obtained. Assuming the compass card 16 had indicated 330° instead of 30°, mere reversal of the above operation would have been employed. The south pole of magnets 1b and 17a and the north poles of magnets 1c and 17b would thereby be brought into proximity by counter-clockwise movement of the knob 10a.

Following compensation for the north cardinal, the craft is swung onto a south course and proper manipulation of the knob 10a accomplished. It may be found that compensation of the south cardinal has adversely affected previous compensation of the north cardinal, in which case it will be necessary to adapt that compensation compromise which will result in minimum combined deviation of the north and south cardinals from the lubber line 13. Upon completion of the above, the craft is swung onto the remaining east and west courses, and proper adjustments of the knob 10b accomplished.

This invention is provided for the purpose of correcting deviations known as semicircular deviations of the compass as expressed by the coefficients B and C in the theory of compass adjustment. It is not designed to take care of such extraordinary or unusual deviations as correction of quadrantal deviations arising from masses of soft iron in proximity to the compass. The corrections provided by this invention will, however, except in most unusual cases, be amply sufficient for small compasses such as are used in aircraft or small water-craft.

What I claim as new and desire to secure by Letters Patent is:

1. In a device of the character described, a housing, two sets of magnets carried by said housing, each set of magnets being composed of two pairs of magnets, the magnets of each respective set of magnets having a common plane of symmetry, the said planes of symmetry being vertically disposed and intersecting at right angles to one another to form a vertical axis of reference, coincident with the vertical axis of the compass, each pair of magnets having its axis of symmetry fixed parallel to and equidistant from said vertical axis of reference, each set of magnets having its axis of symmetry fixed at right angles to said vertical axis of reference, and means for effecting vertical movement of the individual magnets of each set of magnets.

2. In a device of the character described, a housing, two sets of magnets carried by said housing, each set of magnets being composed of two pairs of magnets, the magnets of each respective set of magnets having a common plane of symmetry, the said planes of symmetry being vertically disposed and intersecting at right angles to one another to form a vertical axis of reference, coincident with the vertical axis of the compass, each pair of magnets comprising parallel magnets with adjacent ends of dissimilar polarity and having its axis of symmetry fixed parallel to and equidistant from said vertical axis of reference, each set of magnets having its axis of symmetry fixed at right angles to said vertical axis of reference, and means for effecting vertical movement of the individual magnets of each set of magnets such that the combined magnetic effect of the magnet sets may be varied.

3. In a device of the character described, a housing, two sets of magnets carried by said housing, each set of magnets being composed of two pairs of magnets, the magnets of each respective set of magnets having a common plane of symmetry, the said planes of symmetry being vertically disposed and intersecting at right angles to one another to form a vertical axis of reference, coincident with the vertical axis of the compass, each pair of magnets comprising parallel magnets with adjacent ends of dissimilar polarity and having its axis of symmetry fixed parallel to and equidistant from said vertical axis of reference, each set of magnets having its axis of symmetry fixed at right angles to said vertical axis of reference, and means for effecting vertical movement of the individual magnets of each set of magnets such that either magnet of each pair of magnets may be elevated above the magnet adjacent thereto thus causing the upper end of the elevated magnet to exert a prevailing magnetic influence over the area immediately thereabove.

4. The device as set forth in claim 2, said sets of magnets being constructed and arranged such that each set of magnets has the adjacent ends of the inwardly disposed magnets and the adjacent ends of the outwardly disposed magnets of dissimilar polarity, whereby the four magnets of each set of magnets may be so positioned with respect to each other that the magnetic effect of the combined magnets may be varied.

5. The device as set forth in claim 2, said sets of magnets being constructed and arranged such that each set of magnets has the adjacent ends of the inwardly disposed magnets and the adjacent ends of the outwardly disposed magnets of dissimilar polarity, whereby the four magnets of each set of magnets may be so positioned with respect to each other that the polarity of the upper ends of the outwardly disposed magnets will exert a prevailing magnetic influence over the one immediately above said set of magnets.

6. The device as set forth in claim 2, said sets of magnets being constructed and arranged such that each set of magnets has the adjacent ends of the inwardly disposed magnets and the adjacent ends of the outwardly disposed magnets of dissimilar polarity, whereby the four magnets of each set of magnets may be so positioned with respect to each other that the polarity of the upper ends of the inwardly disposed magnets will exert a prevailing magnetic influence over the area immediately above said set of magnets.

7. In a device of the character described, a housing, two sets of magnets carried by said housing, each set of magnets being composed of two pairs of magnets, the magnets of each respective set of magnets having a common plane of symmetry, the said planes of symmetry being vertically disposed and intersecting at right angles to one another to form a vertical axis of reference coincident with the vertical axis of the compass, each pair of magnets having its axis of symmetry fixed parallel to and equidistant from said vertical axis of reference, each set of magnets having its axis of symmetry fixed at right angles to said vertical axis of reference, and means for effecting equal and opposite vertical movement of individual magnets of each magnet set with reference to its axis of symmetry.

8. In a device of the character described, a housing, two sets of magnets carried by said housing, each set of magnets being composed of two pairs of magnets, the magnets of each respective set of magnets having a common plane of symmetry, the said planes of symmetry being vertically disposed and intersecting at right angles to each other to form a vertical axis of reference coincident with the vertical axis of the compass, each pair of magnets having its axis of symmetry fixed parallel to and equidistant from said vertical axis of reference, each set of magnets having its axis of symmetry fixed at right angles to said vertical axis of reference, and means for simultaneously effecting equal and opposite vertical movement of the innermost and outermost magnets of each set of magnets with reference to its axis of symmetry.

BRADLEY JONES.